(12) United States Patent
Boecker et al.

(10) Patent No.: US 12,350,876 B2
(45) Date of Patent: *Jul. 8, 2025

(54) FUEL TANK WITH STIFFENING DEVICE

(71) Applicant: TI Automotive Technology Center GmbH, Rastatt (DE)

(72) Inventors: Albert J. Boecker, Ettlingen (DE);
Dennis Schwager, Karlsruhe (DE);
Gerrit Michaelis, Durmersheim (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,937

(22) Filed: Jun. 9, 2023

(65) Prior Publication Data

US 2023/0313945 A1 Oct. 5, 2023

Related U.S. Application Data

(63) Continuation of application No. 16/886,697, filed on May 28, 2020, now Pat. No. 11,808,406.

(30) Foreign Application Priority Data

May 31, 2019 (EP) ..................................... 19177664

(51) Int. Cl.
*B60K 15/03* (2006.01)
*B29C 49/42* (2006.01)
(Continued)

(52) U.S. Cl.
CPC ................ *B29C 49/42* (2013.01); *F17C 1/08* (2013.01); *F17C 1/16* (2013.01);
(Continued)

(58) Field of Classification Search
CPC .............. B60K 15/03; B60K 15/03177; B60K 2015/03467; B60K 2015/03032; B60K 2015/03493; B60K 2015/03453
See application file for complete search history.

(56) References Cited

U.S. PATENT DOCUMENTS 5,067,575 A * 11/1991 Hyde ............... B60K 15/03177
403/388
5,308,427 A * 5/1994 Duhaime ................ B29C 65/72
264/516
(Continued)

FOREIGN PATENT DOCUMENTS

CN 103925128 A 7/2014
CN 103925128 B 7/2014
(Continued)

OTHER PUBLICATIONS

European Search Report and Written Opinion dated Jan. 2, 2020.

*Primary Examiner* — Stephen J Castellano
(74) *Attorney, Agent, or Firm* — Dickinson Wright PLLC (57) ABSTRACT

The disclosure relates to a fuel tank including a tank wall which has at least two wall sections opposite one another and a stiffening device situated between the two opposite wall sections. The disclosure further relates to a method for manufacturing such a fuel tank. According to the invention, it is provided that the stiffening device includes at least one connecting strut, each end of which has a profile section, which engages with one complementary profile section each on the two opposite wall sections of the container wall in a tension-resistant manner in such a way that the connecting strut absorbs compressive forces acting on the container wall. The method according to the disclosure for manufacturing a fuel tank including a stiffening device of the aforementioned type is characterized by the following steps: shaping the tank from a thermoplastic material in a blow (Continued)

mold, at least two coupling sections being created on opposite wall sections and an opening being created in one of the wall sections; removing the container from the blow mold; manual or mechanical insertion of at least one connecting strut via the opening into an interior of the container, the ends of at least one connecting strut each including a profile section, which may be coupled to one of the coupling sections of the wall sections in a tension-resistant manner; and manual or mechanical coupling of the profile sections of the connecting strut to the coupling sections of the wall sections.

20 Claims, 6 Drawing Sheets

(51) Int. Cl.
 *F17C 1/08* (2006.01)
 *F17C 1/16* (2006.01)
(52) U.S. Cl.
 CPC .. *F17C 2203/012* (2013.01); *F17C 2203/013* (2013.01); *F17C 2203/066* (2013.01); *F17C 2205/0196* (2013.01); *F17C 2209/2127* (2013.01)

(56) References Cited

U.S. PATENT DOCUMENTS

| | | | | |
|---|---|---|---|---|
| 6,138,859 | A * | 10/2000 | Aulph | B60K 15/03 137/574 |
| 11,808,406 | B2 * | 11/2023 | Boecker | F17C 1/08 |
| 2007/0125344 | A1 * | 6/2007 | Troxler | B60K 15/03 73/866.5 |
| 2011/0139793 | A1 | 6/2011 | Park | |
| 2015/0232226 | A1 | 8/2015 | Heidemeyer et al. | |
| 2018/0335002 | A1 | 11/2018 | Keya | |

FOREIGN PATENT DOCUMENTS

| | | |
|---|---|---|
| CN | 108136894 A | 6/2018 |
| DE | 69816901 | 7/2004 |
| DE | 102013003247 | 9/2014 |
| DE | 102015221378 | 5/2017 |
| EP | 0874511 A2 | 10/1998 |
| EP | 2163694 | 3/2010 |
| EP | 2537696 | 12/2012 |
| EP | 2754581 A1 | 7/2014 |

* cited by examiner

FUEL TANK WITH STIFFENING DEVICE

RELATED APPLICATIONS

The present disclosure is a continuation application from U.S. patent application Ser. No. 16/886,697, filed on May 28, 2020, which is a national phase application of European Application 19177664.0, filed on May 31, 2019, the entire contents of each of which are incorporated herein by reference.

FIELD

The disclosure relates to a fuel tank including a container wall that has at least two opposite wall sections and a stiffening device situated between the two opposite wall sections. The disclosure further relates to a method for manufacturing such a fuel tank.

BACKGROUND

As with many other components of motor vehicles, there are increasing efforts to achieve the lowest possible total weight in the case of fuel tanks while maintaining the mechanical resilience. In fuel tanks which, for operational reasons, may be exposed to an increased internal pressure, stiffening devices, which couple the upper and lower wall sections of the tank to one another, for example, by means of stiffening bodies which may be subjected to pressure and/or tension, are used to stabilize the shape of the tank shell. Such stiffening bodies are arranged, in particular, in the area of a fuel delivery module situated in the container, since an internal pressure on the relatively large projection surface of the container results in high forces on the container wall in the area of the module. Known stiffening devices, especially because of the manner in which they are fastened to the container wall, have a comparatively large volume, such that they disadvantageously reduce the useful volume of the container. The arrangement in the area of the fuel delivery module also presents problems of space.

Based on the foregoing, the object of the disclosure is to develop a stiffening device for the fuel tank that is as space-saving as possible.

To achieve this object, the combinations of features specified in claims 1 and 15 are proposed. Advantageous embodiments and refinements of the disclosure result from the dependent claims.

BRIEF SUMMARY

According to the invention, it is provided that the stiffening device includes at least one connecting strut, each end of which has a profile section, each with a complementary profile section that engages on the two opposite wall sections of the container wall in a tension-resistant manner in such a way that the connecting strut absorbs compressive forces acting on the container wall. The complementary profile sections of the two opposite wall sections of the container wall in this case preferably have an undercut area. The undercut section is expediently created when the opposite wall sections are shaped by a shaping element from the outside of the container. In general, the container wall is made of a thermoplastic material and the shaping element is then advantageously an insert for a blow mold for manufacturing the container, which is overblown when the container is blow-molded. Compared to a welding of stiffening elements into the container also known from the prior art, the disclosure has the advantage that the latter is mechanically less stressable. When a weld is stressed, a so-called peel-off effect may occur, in which the weld seam between the stiffening element and the container wall is ruptured. In addition, there are process-related difficulties, since a subsequent welding of a stiffening element into the finished container is difficult for reasons of space or is impossible depending on the desired location in the container. Given a similar cost of materials, the solution according to the disclosure achieves a higher force absorption capacity as compared to a welding process, in particular, in the tension area.

The insert part preferably has a flat plate section and a profile shaping section, which is essentially mushroom-shaped in cross section and extends normal to the plate section. The insert remains on the container wall after the manufacture of the container. Due to the outwardly flat plate section, the insert does not protrude or protrudes only slightly beyond the outer contour of the container. Depending on the wall thickness of the container wall, the profile shaping section expediently has a height of between 20 mm and 120 mm for the safe formation of the undercut section in the interior of the container.

To couple the connecting strut to the container wall, the ends of the profile sections of the at least one connecting strut in a preferred embodiment of the disclosure include guide elements, which facilitate the pushing of the profile sections onto the complementary profile sections of the opposing wall parts of the container wall.

The end profile sections of the at least one connecting strut may advantageously also include stop elements, which limit a pushing of the profile sections onto the complementary profile sections of the opposite wall sections of the container wall on one side.

In order to prevent an unintentional loosening of the fastening of the connecting strut from the container wall, it is provided in an advantageous embodiment of the disclosure that the end profile sections of the at least one connecting strut include a preferably detachable securing element, which prevents the removal of the profile sections from the complementary profile sections of the mutually opposite wall sections of the container wall. The securing element is preferably designed as a securing bracket, which overlaps side sections of, and can be snapped onto, the profile section. The securing bracket may be connected on one side to the profile section via a plastic hinge, so that it may be inserted into the interior of the container together with the connecting strut, and is then pivoted into its securing position after the profile section has been pushed onto the complementary profile section.

The at least one connecting strut should on the one hand have a small volume, but on the other hand must be mechanically sufficiently stable in order to absorb pressure forces acting on the inside and outside of the container wall. The at least one connecting strut therefore preferably has a flat body with a wall thickness of 2 mm to 20 mm extending between the end profile sections, which for further stiffening may be provided with a plurality of stiffening ribs extending transversely to its flat side to beyond the profile sections.

The container generally has an opening for mounting a fuel delivery module. The complementary profile sections are preferably situated at a short distance from the opening on the one hand and from an opening outline projected onto the opposite wall section on the other hand. Given the comparatively compact design of the connecting strut and of the profile section in the container wall, it is possible to place the at least one connecting strut closer to the opening and to the fuel delivery module than in previous stiffening devices, which promotes their stiffening effect. The distance between the at least one connecting strut and the fuel delivery module is preferably less than 100 mm, preferably less than 50 mm. Generally, two, three or even more such connecting struts are situated around the fuel delivery module at equal or unequal angular distances from one another around the opening.

The method according to the disclosure for manufacturing a fuel tank that includes a stiffening device of the aforementioned type is characterized by the following steps:
  shaping the container from a thermoplastic material in a blow mold, wherein at least two coupling sections are created on opposite wall sections and an opening is created in one of the wall sections,
  removing the container from the blow mold,
  manual or mechanical insertion of at least one connecting strut via the opening into an interior of the container, the at least one connecting strut having a profile section at each end, which may be coupled with one of the coupling sections of the wall sections in a tension-resistant manner, and
  manual or mechanical coupling of the profile sections of the connecting strut with the coupling sections of the wall sections.

The coupling sections of the wall sections in this case preferably include an undercut section and the profile sections of the at least one connecting strut are pushed onto the undercut sections transversely to the longitudinal extension of the connecting strut.

BRIEF DESCRIPTION OF THE DRAWINGS

The disclosure is explained in greater detail below with reference to an exemplary embodiment schematically shown in the drawing. Herein:

FIGS. 4a and b show two variants of a secure fastening of the connection strut to the container wall;

DETAILED DESCRIPTION

Figure 1:
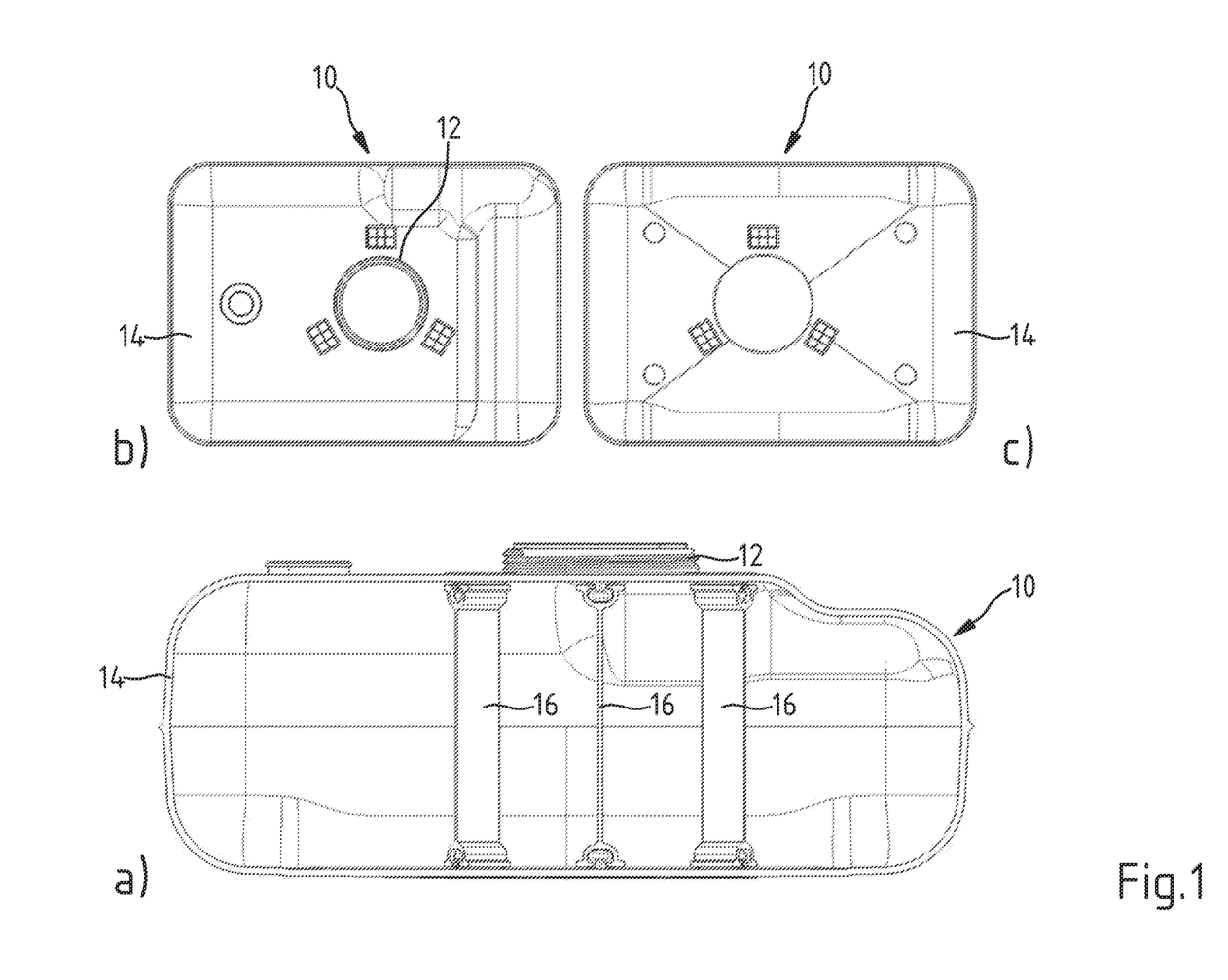
FIGS. 1a through c show a cross section and top and bottom views of a fuel tank with a stiffening device.

The fuel tank 10 shown in FIG. 1 includes an opening 12 on top in its installed position in its tank wall 14, which is primarily intended for mounting an essentially pot-like fuel delivery module, not further depicted. Three connecting struts 16 extending between an upper and a lower wall section, which stiffen the container 10 and thereby absorb compressive forces acting on the container wall 14 from the inside or outside, are situated around the circumferential surface of the cylindrical projection of the opening 12 on the container bottom.

Figure 2:
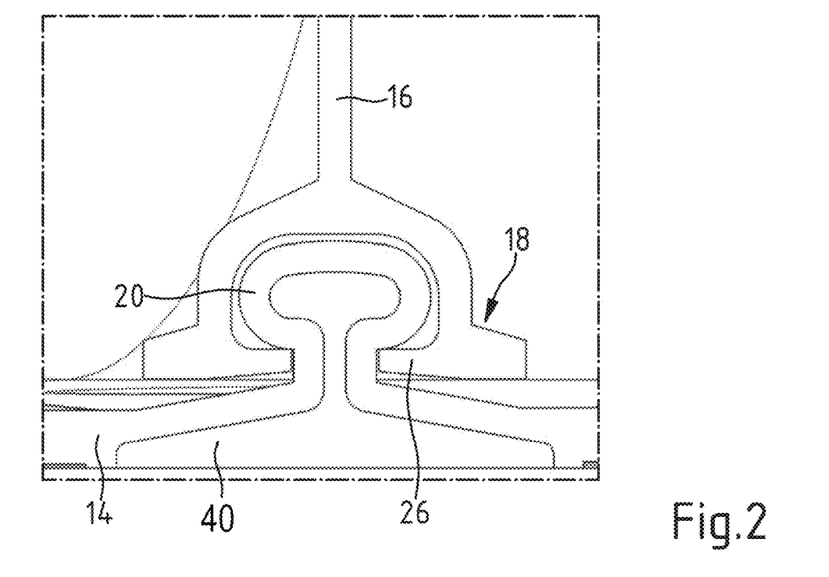
FIG. 2 shows a cross section of the fastening point of a connecting strut on the container wall.

FIG. 2 shows a detailed view of the fastening area of the connecting strut 16 on the container wall 14. For this purpose, the connecting strut 16 has a profile section 18 at each of its end areas, which overlaps a complementary profile section 20 of the container wall 14. Depending on the application requirement, the profile sections 18 may be similar in design or may have different dimensions. The complementary profile section 20 of the container wall 14 is produced by an insert 40, which has been arranged in a blow mold prior to the shaping of the container 10 in the blow mold, and is then partially enclosed by the wall material during the shaping of the container contours.

Figure 3:
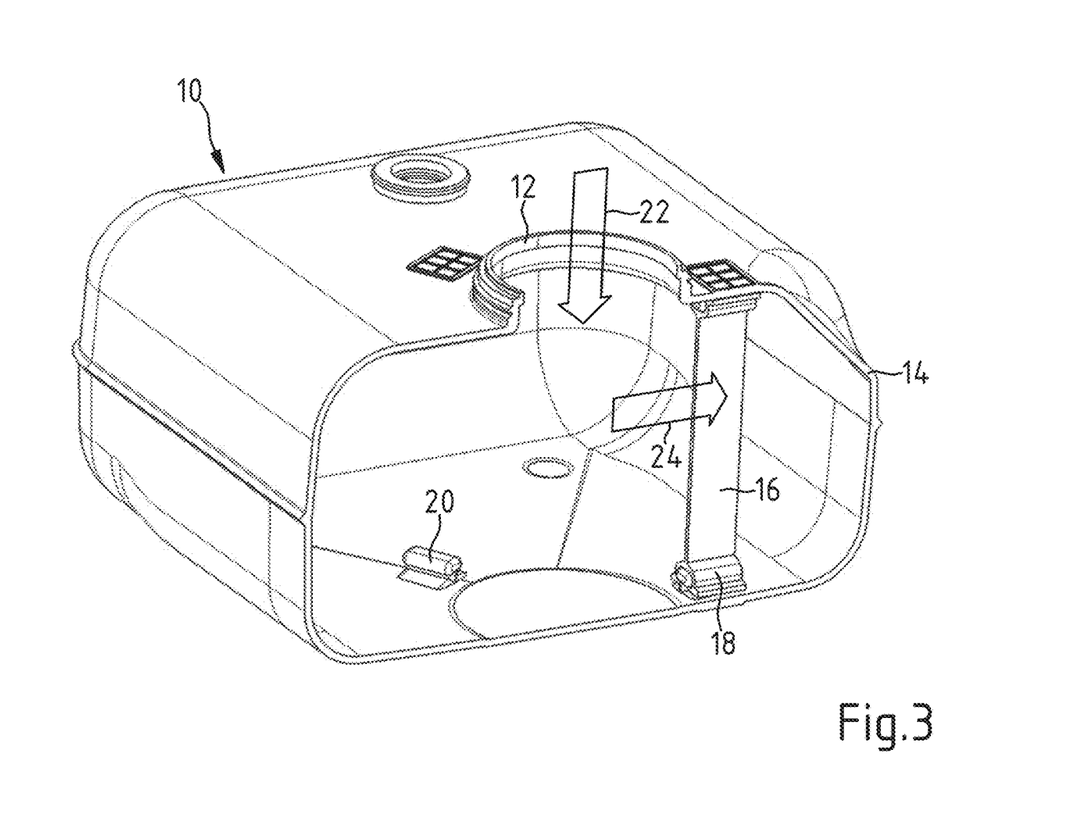
FIG. 3 shows a cross section of the container in the area of a container opening for explaining the installation process of the connecting strut.

FIG. 3 shows a cross section of the container 10 in the area of the opening 12. The connecting strut 16, for mounting the same, is inserted into the container through the opening 12 into the interior of the container 10 (arrow 22) and then laterally displaced (arrow 24) in such a way that the profile section 18 of the connecting strut 16 is pushed onto and overlaps the complementary profile section 20 of the container wall 14. Due to the positive connection between the profile section 18 of the connecting strut 16 and the complementary profile section 20 of the container wall 14, forces 14 acting from inside or outside on the container wall as tensile forces and compressive forces in the longitudinal direction of the connecting strut 16, i.e., in the connecting direction between the opposite wall sections of the container wall 14 supporting the complementary profile sections 20, may be absorbed by the connecting strut 16. To better absorb pressure forces acting on the connecting strut 16, the profile section 18 includes widened foot sections 26 (FIG. 2), which may be supported on the inside of the container wall 14.

Figure 4:
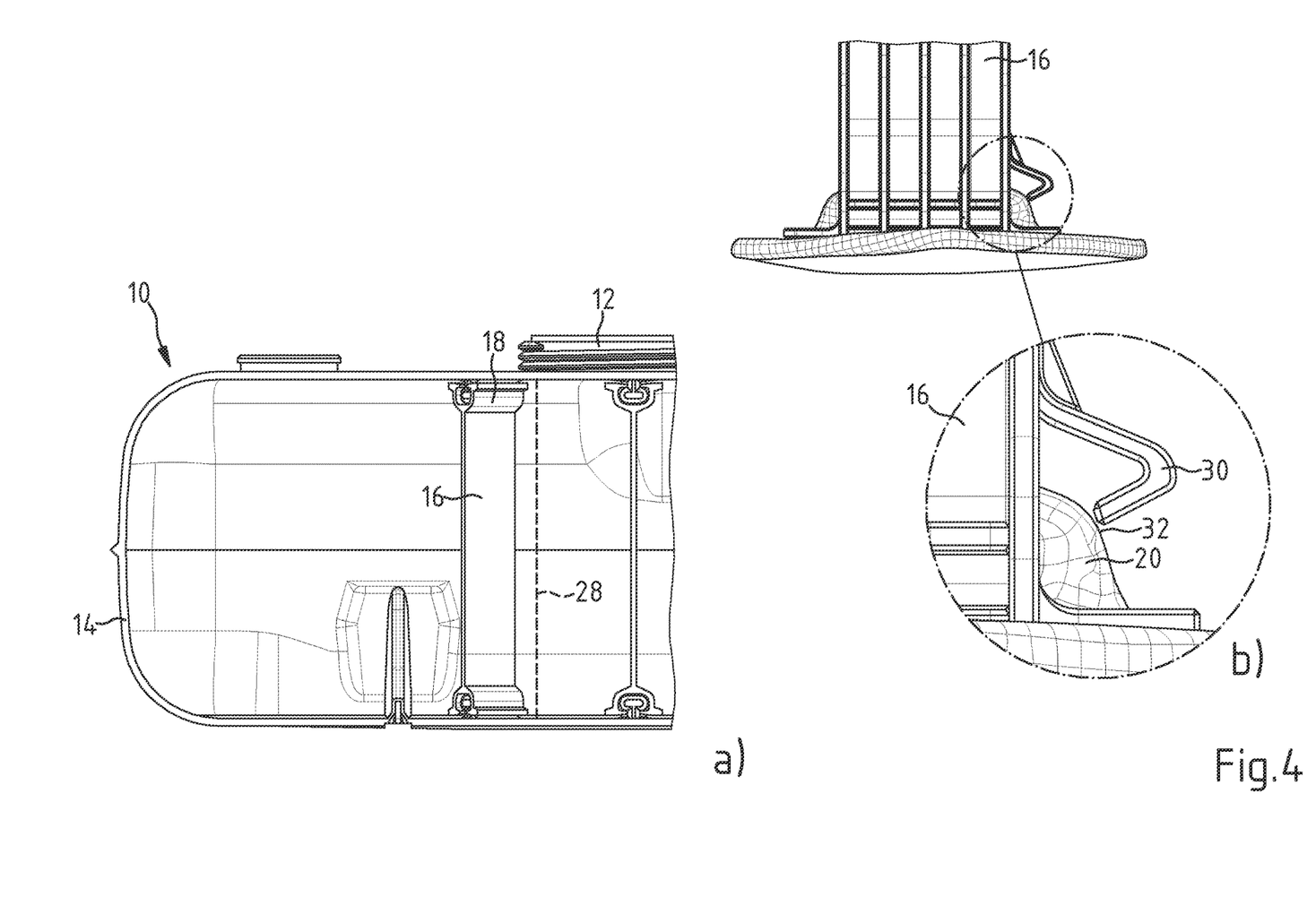

FIG. 4 shows two possibilities for securing the connecting strut 16 against undesirable detachment from the complementary profile section 20. In FIG. 4a, the complementary profile sections 20 of the container wall 14 are situated in the immediate vicinity of a fuel delivery module installed in the container 10 after the mounting of the connecting strut 16, the circumferential surface of which is represented by the broken line 28. Due to the proximity of the connecting strut 16 to the fuel delivery module, a displacement of the connecting strut 16 in the direction of the latter is blocked and the fastening of the connecting strut 16 is thereby secured. To remove the connecting strut 16, the fuel delivery module would first have to be removed from the container 10, which would be necessary in any case for accessing the connecting strut 16. In the variant of FIG. 4b, the profile section 18 of the connecting strut 16 includes a leaf spring 30, which rests against a rear edge 32 of the complementary profile section 20 when the profile section 18 of the connecting strut 16 is pushed completely onto the complementary profile section 20 of the container wall 14.

Figure 5:
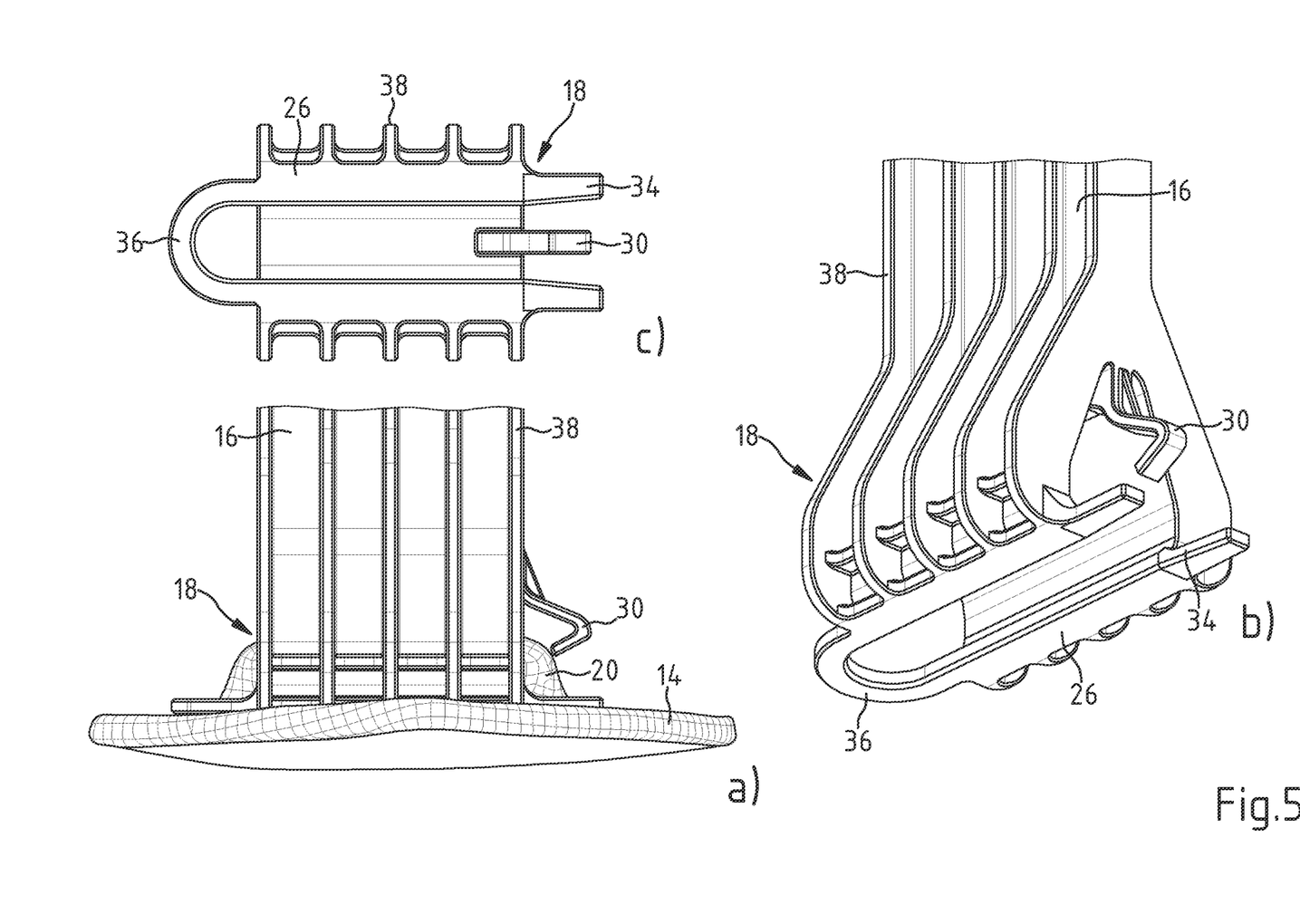
FIGS. 5a through c show detailed views of a profile section of the connecting strut.

FIG. 5 shows detailed views of the profile section 18 of the connecting strut 16. FIG. 5a shows the profile section 18 of the connecting strut 16 mounted on the complementary profile section 20 of the container wall 14. Positioning when the profile section 18 is pushed onto the complementary profile section 20 is facilitated by a leading bevel edge 34. A stop 36 is provided opposite the leading bevel edge at the other end of the profile opening, which prevents the profile section 18 from being pushed over the complementary profile section 20 beyond the desired final assembly position. The connecting strut 16 is designed essentially as a flat body extending between the end profile sections 18. In order to be able to better absorb pressure forces in particular, the connecting strut 16 includes a plurality of stiffening ribs 38, which expediently extend over the entire length of the connecting strut 16, i.e., also cover the area of the profile section 18.

Figure 6:
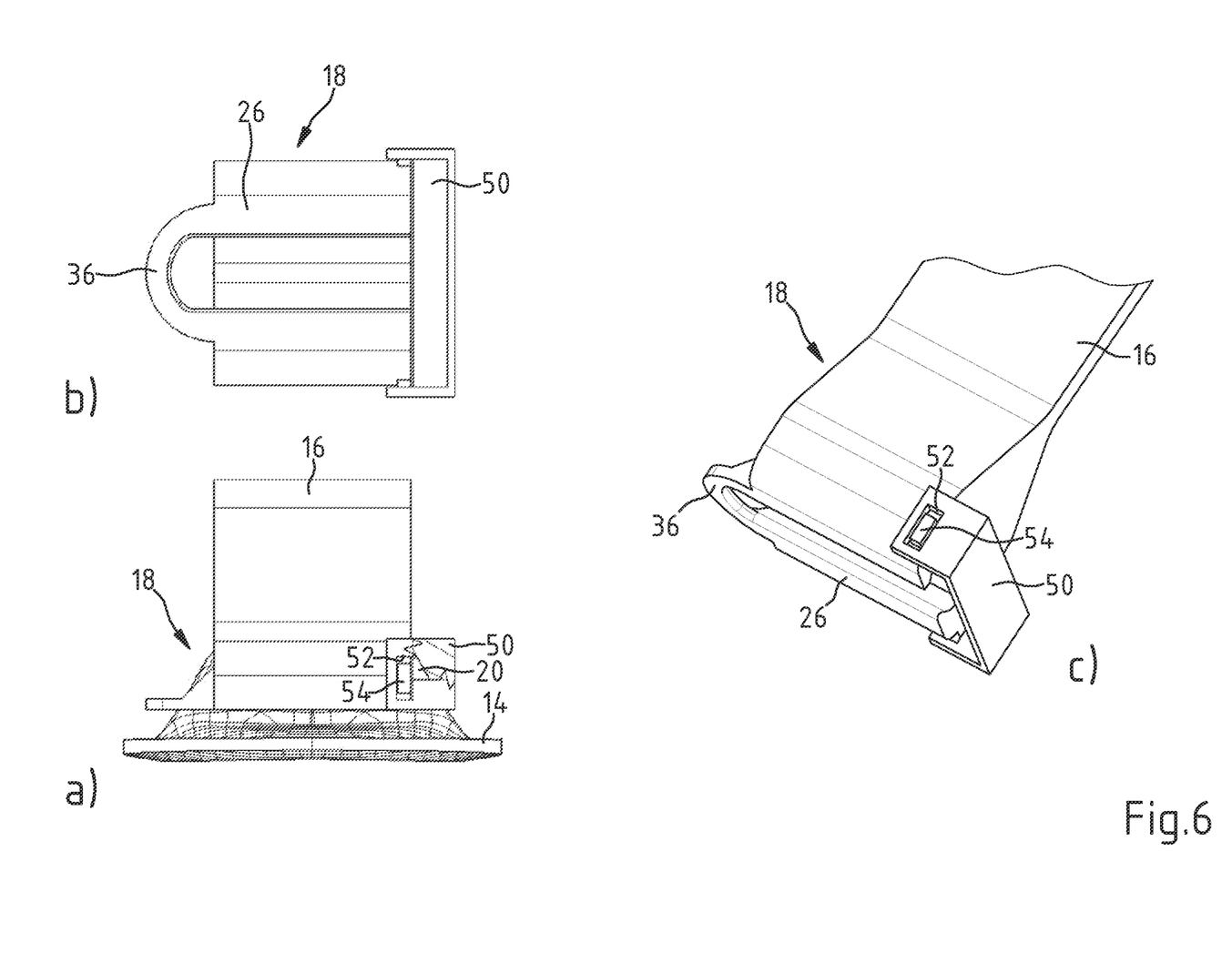
FIGS. 6a through c show a variant of a securing element for the connecting strut.

FIG. 6 shows the area of the profile section 18 of the connecting strut 16 in different views. A securing element for the connecting strut 16 is provided that is designed as a securing bracket 50. The securing bracket 50 overlaps the profile opening of the profile section 18 and has two lateral snap-in openings 52. Once the connecting strut 16 is installed, the securing bracket is snapped onto complementary locking lugs 54 on the side surfaces of the profile section 18.

Figure 7:
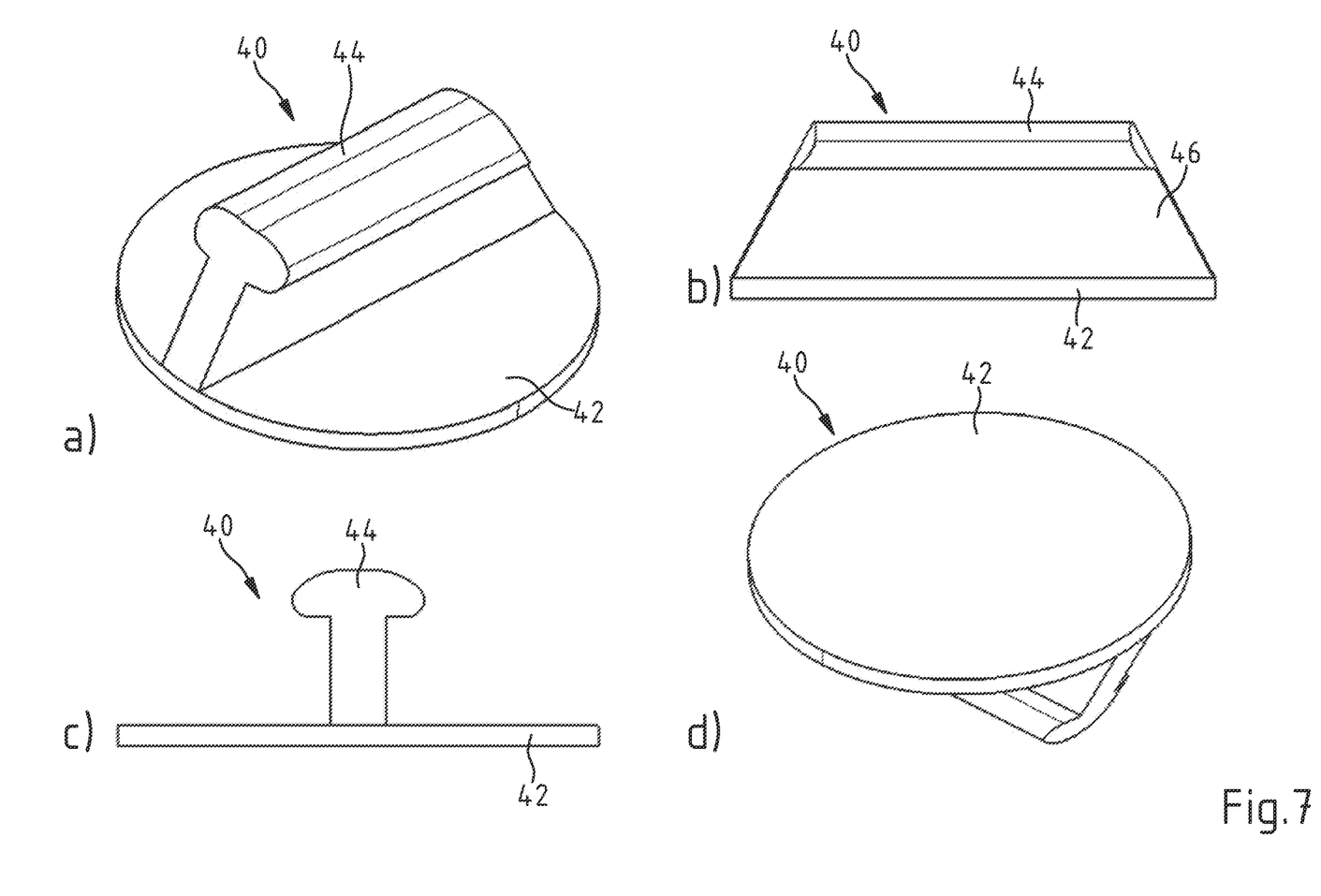
FIGS. 7a through d show different views of an insert for a blow mold to create a complementary profile section on the container wall.

FIG. 7 shows various views of the insert 40. The insert 40 has a flat plate section 42 and a profile shaping section 44 projecting essentially vertically therefrom, which is approximately mushroom-shaped in cross section, in order in this way to facilitate the shaping of the undercut section of the complementary profile section 20. Openings 46, which ensure an additional positive connection when the insert 40 is overmolded by the material of the container wall 14, are provided in a web-like connection area between the profile shaping section 44 and the plate section 42.

In summary the following may be noted: The disclosure relates to a fuel tank 10 including a container wall 14 having at least two opposite wall sections and a stiffening device situated between the two opposite wall sections. The disclosure further relates to a method for manufacturing such a fuel tank. According to the invention, it is provided that the stiffening device includes at least one connecting strut 16, each end having a profile section 18, each of which has a complementary profile section 20 that engages on the two opposite wall sections of the container wall 14 in a tension-resistant manner in such a way that the connecting strut 16 absorbs compressive forces acting on the container wall 14. The method according to the disclosure for manufacturing a fuel tank 10 including a stiffening device of the aforementioned type is characterized by the following steps: shaping the container 10 from a thermoplastic material in a blow mold, wherein at least two coupling sections are created on opposite wall sections and an opening 12 is created in one of the wall parts; removing the container 10 from the blow mold; manual or mechanical insertion of at least one connecting strut 16 via the opening 12 into an interior of the container 10, the at least one connecting strut 16 having a profile section 18 at each end, which can be coupled with one of the coupling sections of the wall sections in a tension-resistant manner; and manual or mechanical coupling of the profile sections 18 of the connecting strut 16 to the coupling sections of the wall sections.

The invention claimed is:

1. A fuel tank comprising:
a container wall having at least two opposite wall sections; and
a stiffening device situated between the two opposite wall sections, wherein the stiffening device has at least one connecting strut, each end of which has a strut profile section, which engages with a complementary wall profile section formed unitarily from the container wall in each on the two opposite wall sections of the container wall in a tension-resistant manner in such a way that the connecting strut absorbs compressive forces acting on the container wall;
wherein the complementary wall profile sections of the two opposite wall sections of the tank wall have an under-cut section, and wherein the strut profile sections are U-shaped with inwardly projecting feet at the ends of the U-shape, the strut profile sections extending around an exterior of the wall profile section such that the feet project into the under-cut section of the wall profile section when the strut is connected to the container wall;
wherein each strut profile section at the ends of the stiffening device face in a lateral direction such that strut profile sections are connected to the complementary wall profile sections of the container wall by laterally displacing the stiffening device in the lateral direction such that the strut profile sections mate with the complementary wall profile sections.

2. The fuel tank according to claim 1, wherein the strut profile sections of the at least one connecting strut include guide elements, which facilitate a pushing of the strut profile sections onto the complementary wall profile sections of the opposite wall sections of the container wall.

3. The fuel tank according to claim 1, wherein the end strut profile sections of the at least one connecting strut include stop elements, which limit a pushing of the strut profile sections onto the complementary wall profile sections of the opposite wall sections of the container wall on one side.

4. The fuel tank according to claim 1, wherein the strut profile sections of the at least one connecting strut include a detachable securing element, which prevents the removal of the strut profile sections from the complementary wall profile sections of the opposite wall sections of the container wall.

5. The fuel tank according to claim 4, wherein the securing element is designed as a securing bracket, which overlaps, and is configured to be snapped onto, the side sections of the strut profile section.

6. The fuel tank according to claim 1, wherein the at least one connecting strut includes a flat body having a wall thickness of 2 mm to 20 mm extending between the end strut profile sections, which is provided with a plurality of reinforcing ribs extending transversely to a flat side of the at least one connecting strut to a point beyond the strut profile sections.

7. The fuel tank according to claim 1, wherein the tank includes an opening in the area of one of the opposite wall sections, and wherein the complementary wall profile sections are situated near the opening and an opening outline projected onto the opposite wall section.

8. The fuel tank according to claim 7, wherein a distance between the complementary wall profile sections and the opening is less than 100 mm.

9. The fuel tank according to claim 7, wherein a plurality of connecting struts are situated at equal or unequal angular distances from one another around the opening.

10. The fuel tank according to claim 7, wherein a distance between the complementary profile sections and the opening is less than 50 mm.

11. A fuel tank comprising:
a container wall having at least two opposite wall sections; and
a stiffening device situated between the two opposite wall sections, wherein the stiffening device has at least one connecting strut, each end of which has a strut profile section, which engages with a complementary wall profile section formed unitarily from the container wall in each on the two opposite wall sections of the container wall in a tension-resistant manner in such a way that the connecting strut absorbs compressive forces acting on the container wall, wherein the complementary wall profile sections of the two opposite wall sections of the container wall have an under-cut section;

wherein each strut profile section at the ends of the stiffening device face in a lateral direction such that strut profile sections are connected to the complementary wall profile sections of the container by laterally displacing the stiffening device in the lateral direction such that the strut profile sections mate with the complementary wall profile sections, wherein the strut profile sections are U-shaped with inwardly projecting feet at the ends of the U-shape, the strut profile sections extending around an exterior of the wall profile section such that the feet project into the under-cut section of the wall profile section when the strut is connected to the container wall;

wherein the complementary wall profile sections are each supported by a shaping element engaged with the container wall in an area of the complementary wall profile section, the shaping element being positioned against an exterior surface of the container wall such that the wall profile sections project inwardly into the container and relative to an interior surface of a surrounding container wall portion, and wherein the under-cut section is created during a shaping of the opposite wall sections by positioning the shaping element against the container wall from the outside of the tank.

12. The fuel tank according to claim 11, wherein the tank wall consists of a thermoplastic material and that the shaping element is an insert for a blow mold for manufacturing the container, which is overblown by the respective wall section when the container is blow molded.

13. The fuel tank according to claim 11, wherein the shaping element comprises an insert that has a flat plate section and an insert profile section which is essentially mushroom-shaped in cross section and extends normally to the plate section.

14. The fuel tank according to claim 13, wherein the insert profile section has a height between 20 mm and 120 mm.

15. The fuel tank according to claim 11, wherein the at least one connecting strut includes a flat body having a wall thickness of 2 mm to 20 mm extending between the strut profile sections, which is provided with a plurality of reinforcing ribs extending transversely to a flat side of the at least one connecting strut to a point beyond the strut profile sections.

16. The fuel tank according to claim 11, wherein the strut profile sections of the at least one connecting strut include a detachable securing element, which prevents the removal of the strut profile sections from the complementary wall profile sections of the opposite wall sections of the container wall.

17. A fuel tank comprising:
a container wall having at least two opposite wall sections; and
a stiffening device situated between the two opposite wall sections, wherein the stiffening device has at least one connecting strut, each end of which has a strut profile section, which engages with a complementary wall profile section formed unitarily from the container wall in each on the two opposite wall sections of the container wall in a tension-resistant manner in such a way that the connecting strut absorbs compressive forces acting on the container wall;

wherein each strut profile section at the ends of the stiffening device face in a lateral direction such that strut profile sections are connected to the complementary wall profile sections of the container wall by laterally displacing the stiffening device in the lateral direction such that the strut profile sections mate with the complementary wall profile sections;

wherein the complementary wall profile sections are each supported by a shaping element engaged with the container wall in an area of the complementary wall profile section, the shaping element being positioned against an exterior surface of the container wall such that the wall profile sections project inwardly into the container and relative to an interior surface of a surrounding container wall portion, and wherein the under-cut section is created during a shaping of the opposite wall sections by positioning the shaping element against the container wall from the outside of the tank;

wherein the strut profile sections of the at least one connecting strut include a detachable securing element, which prevents the removal of the strut profile sections from the complementary wall profile sections of the opposite wall sections of the container wall.

18. The fuel tank according to claim 17, wherein the complementary wall profile sections of the two opposite wall sections of the container wall have an under-cut section, and wherein the strut profile sections are U-shaped with inwardly projecting feet at the ends of the U-shape, the strut profile sections extending around an exterior of the wall profile section such that the feet project into the under-cut section of the wall profile section when the strut is connected to the container wall.

19. The fuel tank according to claim 17, wherein the securing element is designed as a securing bracket, which overlaps, and is configured to be snapped onto, the side sections of the strut profile section.

20. The fuel tank according to claim 17, wherein the strut profile sections of the at least one connecting strut include stop elements, which limit a pushing of the strut profile sections onto the complementary wall profile sections of the opposite wall sections of the container wall on one side.

* * * * *